United States Patent
Takatori et al.

(10) Patent No.: US 6,763,231 B2
(45) Date of Patent: Jul. 13, 2004

(54) RADIO COMMUNICATION DEVICE, PARENT COMMUNICATION DEVICE, PARENT-CHILD COMMUNICATION DEVICE AND RADIO COMMUNICATION SYSTEM

(75) Inventors: Sunao Takatori, Tokyo (JP); Hisanori Kiyomatsu, Tokyo (JP)

(73) Assignee: Yozan Inc., Tokyo (JP)

( * ) Notice: Subject to any disclaimer, the term of this patent is extended or adjusted under 35 U.S.C. 154(b) by 37 days.

(21) Appl. No.: 10/182,666

(22) PCT Filed: Dec. 25, 2000

(86) PCT No.: PCT/JP00/09189

§ 371 (c)(1),
(2), (4) Date: Jul. 31, 2002

(87) PCT Pub. No.: WO02/052878

PCT Pub. Date: Jul. 4, 2002

(65) Prior Publication Data

US 2003/0008647 A1 Jan. 9, 2003

(51) Int. Cl.[7] .............................. H04Q 7/20; H04Q 7/22
(52) U.S. Cl. ..................... 455/420; 455/459; 455/462; 455/458; 370/336
(58) Field of Search .................. 455/420, 426.1, 455/458, 459, 462, 465; 340/729; 370/336

(56) References Cited

U.S. PATENT DOCUMENTS

| | | | | |
|---|---|---|---|---|
| 5,991,631 A | * | 11/1999 | Jonsson ...................... | 455/459 |
| 6,026,297 A | * | 2/2000 | Haartsen ................... | 455/426.1 |
| 6,094,583 A | * | 7/2000 | Harano ...................... | 340/7.29 |
| 6,314,298 B1 | * | 11/2001 | Hiroki ........................ | 455/465 |
| 6,622,018 B1 | * | 9/2003 | Erekson ...................... | 455/420 |
| 6,639,905 B1 | * | 10/2003 | Muller et al. ................ | 370/336 |

FOREIGN PATENT DOCUMENTS

| | | | | |
|---|---|---|---|---|
| JP | 5-130029 | 5/1993 | | |
| JP | 8-195983 | 7/1996 | | |
| JP | 11-98577 | 4/1999 | | |
| JP | 11098577 | * 4/1999 | ............ | H04Q/7/38 |
| JP | 2000-224656 | 8/2000 | | |

* cited by examiner

Primary Examiner—Nay Maung
Assistant Examiner—Alan T. Gantt
(74) Attorney, Agent, or Firm—Wenderoth, Lind & Ponack, L.L.P.

(57) ABSTRACT

The present invention relates to a slave communication device which received control delegation from a master communication device and performs communication with an originating telephone apparatus through a host station based on a call originated from that originating telephone apparatus, and has a master communication device 1 having a unique master ID set therefor for using a wireless telephone line provided by a host station 3 and one or more slave communication devices 2 receiving control delegation from the master communication device 1 to perform communication using the wireless telephone line for the master communication device 1. The slave communication device 2 comprises storage means for storing the master ID and a slave ID recognizable by the master communication device 1, wireless communication means for performing communication using the wireless telephone line for the master communication device 1 through the host station 3, pager signal reception means for receiving a pager signal of a radio paging system, and control means for controlling the wireless communication means based on a predetermined pager signal received by the pager signal reception means.

42 Claims, 7 Drawing Sheets

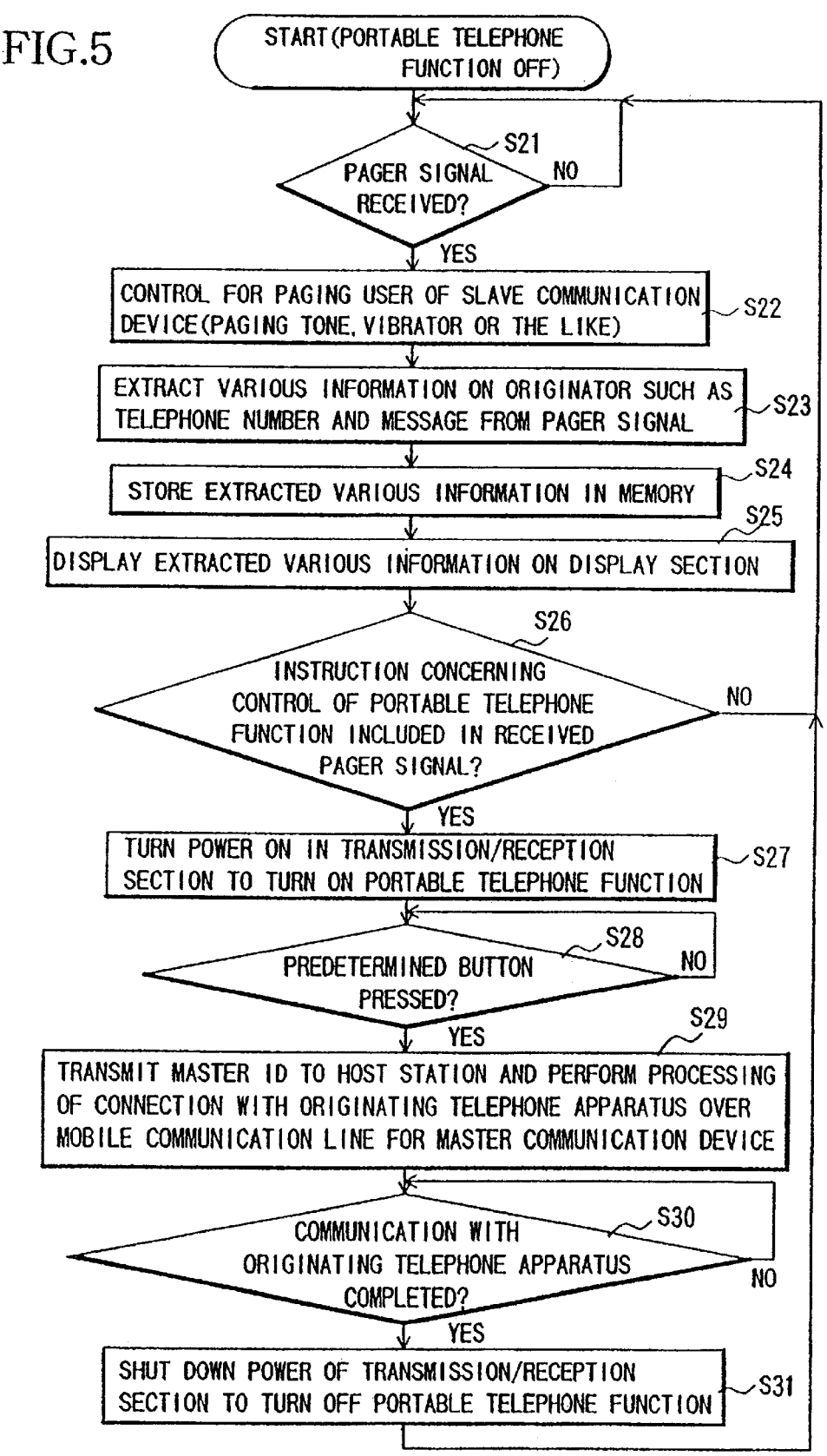

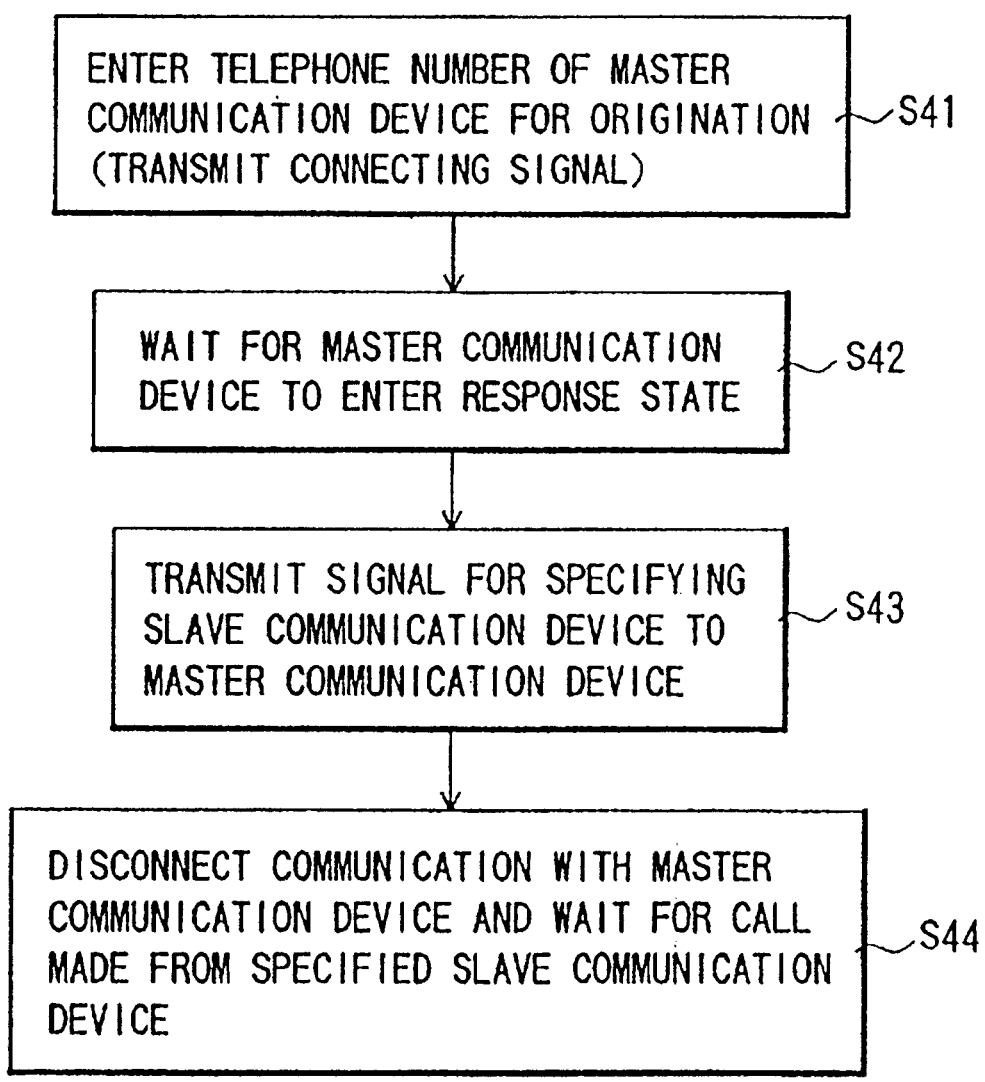

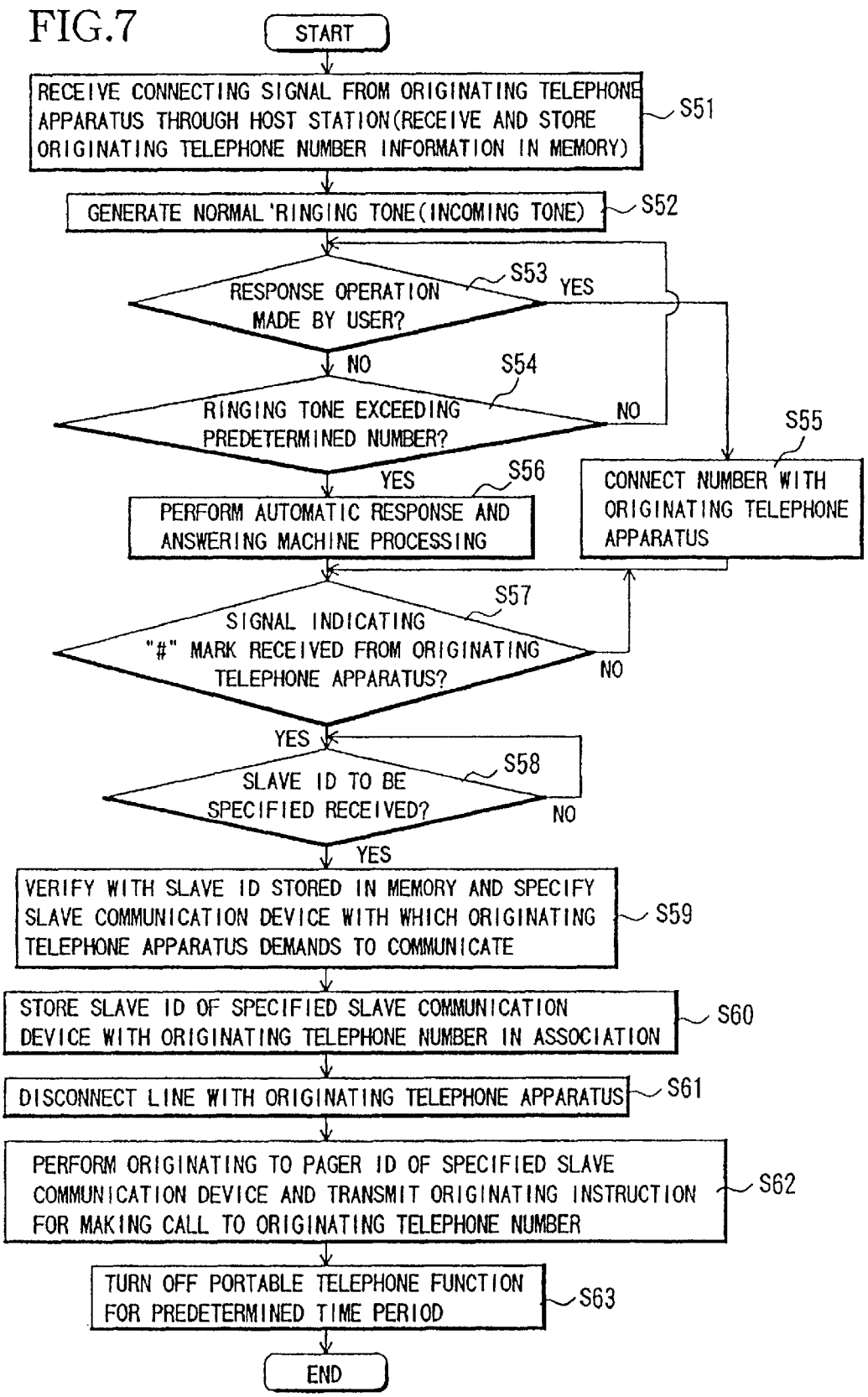

RADIO COMMUNICATION DEVICE, PARENT COMMUNICATION DEVICE, PARENT-CHILD COMMUNICATION DEVICE AND RADIO COMMUNICATION SYSTEM

TECHNICAL FIELD

The present invention relates to a wireless communication device, a master communication device, a master/slave communication device, and a wireless communication system, and more specifically, to a wireless communication device, a master communication device, a master/slave communication device, and a wireless communication system in which, after control is delegated to one or more slave communication devices from a master communication device, any of the slave communication devices is specified by originating from an unspecified originating telephone apparatus to perform communication between that slave communication device and the originating telephone apparatus through a host station.

BACKGROUND ART

The development of fixed telephones, mobile communication telephones and the like has been remarkable, and it is expected that, in the near future, communication functions using fixed telephone lines or mobile communication telephone lines are added to a considerable number of electronic apparatuses (for example, television sets, various kinds of cameras and the like). Here, when a case is assumed where the communication functions are added to various kinds of electronic apparatuses., if different telephone lines are set for respective ones of the electronic apparatuses, various problems arise such as unregulated creation of IDs such as telephone numbers managed by users and host stations, and bloating of base rates of telephone lines borne by users. It is thus necessary to construct a system in which a plurality of electronic apparatuses can share a common telephone line.

Also, in IMT-2000 which is a next-generation mobile communication system, it is expected that a function referred to as so-called multicall, that is, a function allowing a plurality of mobile communication devices to simultaneously perform communication over a single mobile communication telephone line in a range of communication speeds provided for that telephone line is added. In this case, a system which avoids the aforementioned problems such as the unregulated creation of IDs is also needed.

Specifically, in a mobile communication system, seeing that frequency bands allocated to mobile communication are finite, telephone number resources allocated to individual mobile communication devices are also finite, and if unique IDs are allocated to respective electronic apparatuses, it is expected that the telephone number resources are readily exhausted while unutilized telephone numbers are suddenly increased. Thus, in a next-generation mobile communication system, it is inevitable that telephone numbers are allocated with reluctance to individual mobile communication devices, which may become a factor in increasing a base rate for a single ID.

Conventionally, to use a telephone line common to a plurality of electronic apparatuses, in the case of a fixed telephone line, a line such as an ISDN line through which a plurality of communication processing can be simultaneously processed is installed to construct a local area network (LAN), and a personal computer, a facsimile apparatus and the like having communication functions are connected to the LAN, thereby avoiding the aforementioned problems, for example.

When a telephone line common to a plurality of electronic apparatuses is intended to be used and when each electronic apparatus does not change its location, the construction of a LAN as mentioned above can deal with the case. However, when that electronic apparatus is a portable telephone, a digital camera, a video camera, or another mobile communication device having portability and premised on movement, or when it is installed in a position where the construction of a LAN is relatively difficult even when its location is not changed, it is difficult to deal with the case with a LAN.

In addition, in recent years, data transmission/reception through radio signals among a plurality of electronic apparatuses with Bluetooth (see Nikkei Electronics Jan. 17, 2000, pp.37–44) or the like has been proposed. In this case, however, there is also a problem of a transmission/reception range of radio waves with Bluetooth being limited to within a short range. Furthermore, when a large amount of data is transmitted and received over a mobile communication telephone line, an electronic apparatus such as a portable telephone performing communication with a host station through radio waves over the mobile communication telephone line also performs processing of transmitting data on radio waves to another electronic apparatus through the Bluetooth, so that a problem of power consumption may arise in that portable telephone or the like.

To address such problems, the present applicant has already proposed "Control Delegation System for Telephone Line" (Patent Application 2000-122791). The control delegation system uses a master communication device having a master terminal ID such as a unique telephone number for utilizing a telephone line provided by a host station and one or more slave communication devices for which slave terminal IDs created on the basis of the master terminal ID and recognizable by the host station (host computer) are set and which use those slave terminal ID to utilize the telephone line for the master communication device.

The control delegation system is a new system totally different from a conventional extension telephone in which a base unit and one or more handsets are used and any one of them utilizes the same telephone line, in that the slave communication devices utilize the telephone line using the slave terminal IDs created on the basis of the master terminal ID, that the host computer which received the slave terminal ID performs authentication of the correspondence relationship between that slave terminal ID and the master terminal ID or the like, that the slave communication device can perform originating (originate a call) by itself using the telephone line for the master communication device even when it becomes distant from the master communication device, that the respective terminals can simultaneously perform communication within a range of communication speeds previously allocated by the host computer of the master communication device (applicable to multicall), that it is possible to specify contents of control delegated by the master communication device to the slave communication device (for example, the communication speed to be used, dedicated to transmission, dedicated to reception, or the like), and the like.

According to the control delegation system, since communication functions for using the telephone line based on the ID of the master terminal are added to the plurality of slave communication devices and a state is established in which control for using the telephone line is delegated to the plurality of slave communication devices by a communication means of the master communication device, it is possible to perform processing such as substitute execution of communication, which should be essentially performed by the master communication device, by the slave communication device.

In the control delegation system, for an originating function (originating a call) of the communication functions of the slave communication device to which control has been delegated, each slave communication device uses a slave terminal ID created by, for example, adding a branch number to the telephone number of the master communication device to establish communication within the range of the communication speeds of the master communication device, so that the plurality of slave communication devices can perform originating respectively while using the common telephone line to solve the aforementioned problems.

Specifically, a slave communication device which does not have a unique ID (telephone number or the like) performs originating by using a slave terminal ID (for example, "090-1234-5678-01") created on the basis of the master terminal ID (for example, "090-1234-5678") of the master communication device to allow various communications to be performed through the host station. In other words, each slave communication device for which control delegation has been completed and a slave terminal ID has been set can directly perform various communications through the host station, thereby eliminating the need for the intervention of the master communication device and the need that it should be within a short distance from the master communication device and the other slave communication devices. Thus, according to the control delegation system, the problem of the positional relationship among the electronic apparatuses is solved, and further, the problem of power consumption in the master communication device is also solved.

On the other hand, for a termination function of the communication functions of the slave communication device to which control has been delegated, for example, the slave terminal IDs and the correspondence relationship between those slave terminal IDs and the master terminal ID are previously registered in the host station and a telephone or the like of an originating party specifies the ID of the slave communication device at the time of origination of a call to allow establishment of bi-directional communication between the originating party and the slave communication device on the terminating party through the host station.

Incidentally, when a mobile communication telephone line with radio signals is used in the control delegation system, a problem as described below is expected to arise when a larger number of slave communication devices have slave terminal IDs set therefor in connection with location registration performed on the host station side.

Specifically, there is a problem that, when a larger number of slave communication devices receive control delegation from the master communication device and have slave terminal IDs set therefor, a burden of processing for the location registration is excessive on the host station side if respective users carrying respective communication devices move to positions distant from one another, causing the possibility of failing to deal with such a case.

Typically, in the mobile communication system, the configuration of the host station is provided with a single central control station having a host computer, and a plurality of base stations connected to the central control station and performing transmission and reception of radio signals (radio waves) for communication. The respective base stations monitor the positions of respective portable telephones present within certain areas, respectively, to transmit position information of the respective portable telephones to the central control station which performs registration (area registration) based on the position information.

Then, a typical portable telephone (including a PHS, a PDA or the like) originates a weak radio wave (hereinafter referred to as "a radio signal for location registrations") including an ID of that portable telephone (telephone number information) receivable by a base station in an area where that portable telephone exists in order to perform communication through any one of the respective base stations. Here, when an unspecified telephone (hereinafter referred to as "an originating telephone apparatus") and a portable telephone make a call, the central control station performs control for connecting communication based on originating (origination of a call) from any telephone through a base station in an area where that portable telephone exists.

Thus, if the control delegation system presented earlier by the present applicant is applied to such a system for a mobile communication telephone line, when a number of slave communication devices to which control has been delegated originate radio signals for location registration simultaneously by using the slave terminal IDs different from one another based on the master terminal ID from areas different from one another, a burden of processing is excessive on the central control station side which controls the respective base stations, causing the possibility of failing to deal with such a case.

Such a problem can be addressed by each user carrying each slave communication device voluntarily turning off the main power supply of the communication device to normally prevent originating of the radio signal for location registration and turning on the main power supply only when it is required. However, a problem concerning termination then occurs that each slave communication device cannot receive a call originated by the said originating telephone apparatus.

In addition, in the already proposed control delegation system, since the host station side must register the correspondence relationship between the master terminal ID and the slave terminal IDs to perform the processing of authentication for communication performed by the slave communication devices, the processing is not completed only by the master communication device and the respective slave communication devices and the host station side needs to perform various processing.

DISCLOSURE OF THE INVENTION

It is an object of the present invention to provide a wireless communication device as a slave communication device, a master communication device, a master/slave communication device, and a wireless communication system which allow a slave communication device to perform communication with an originating telephone apparatus through a host station based on a call originated from that originating telephone apparatus even when there are a number of slave communication devices which received control delegation from a master communication device to have slave IDs set therefor and that slave communication device moves to a position away from the master communication device or the other slave communication devices.

A first configuration of a wireless communication device according to the present invention is a wireless communication device receiving control delegation from a master communication device having a unique master ID set therefor for using a wireless telephone line provided by a host station to perform communication using the wireless telephone line for said master communication device, characterized by comprising storage means for storing the master ID and a slave ID recognizable by the master communication device, wireless communication means for performing communication using the wireless telephone line for the master communication device through the host station, pager signal reception means for receiving a pager signal of a radio paging system, and control means for controlling the wireless communication means based on a predetermined pager signal received by the pager signal reception means.

A second configuration of a wireless communication device according to the present invention is characterized, in the first configuration, in that the control means normally turns off the power of the wireless communication means, and when the pager signal reception means receives a pager signal, determines whether or not the pager signal includes an originating instruction that originating should be performed to an originating telephone number, and when it determines that it is not included, performs control to maintain the power of the wireless communication means off.

A third configuration of a wireless communication device according to the present invention is characterized, in the second configuration, in that the control means performs control to turn on the power of the wireless communication means when it determines that the originating instruction that originating should be performed to the originating telephone number is included.

A fourth configuration of a wireless communication device according to the present invention is characterized, in the third configuration, in that the control means controls the wireless communication means to perform originating to an originating telephone apparatus of the originating telephone number using the master ID after the power of the wireless communication means is turned on.

A fifth configuration of a wireless communication device according to the present invention is characterized, in any one of the first to fourth configurations, in that, when the pager signal reception means receives the pager signal Including the originating telephone number of the originating telephone apparatus, the control means performs control to notify a user of the fact that a telephone call should be made to the originating telephone apparatus of the originating telephone number.

A sixth configuration of a wireless communication device according to the present invention is characterized, in any one of the first to fifth configurations, by further comprising transmission/reception means for receiving the slave ID created by the master communication device in the control delegation and performing transmission and reception of various signals to and from the master communication device, and characterized in that, when the transmission/reception means receives the slave ID, the control means controls the storage means to store the slave ID in the storage means.

A seventh configuration of a wireless communication device according to the present invention is characterized, in the sixth configuration, in that the storage means has a pager ID stored therein for the page signal received by the pager signal reception means, and the control means controls the storage means and the transmission/reception means to read and transmit the pager ID to the master communication device in the control delegation.

A first configuration of a master communication device according to the present invention is a master communication device having a unique master ID set therefor for using a wireless telephone line provided by a host station, using n (n is an integer equal to or larger than one) wireless communication devices provided with any one of the said first to seventh configurations as slave communication devices, and providing each of the slave communication devices with a slave ID created on the basis of the master ID to perform control delegation to each of the slave communication devices, characterized by comprising wireless communication means for performing wireless communication through the host station by transmitting the master ID to the host station, and control means for controlling the wireless communication means, and characterized in that, when the wireless communication means receives, during communication with an originating telephone apparatus, a signal indicating an originating telephone number of the originating telephone apparatus and a signal specifying any of the slave communication devices to which control has been delegated originated from the originating telephone apparatus, the control means disconnects the communication with the telephone apparatus and controls the wireless communication means such that the pager signal reception means of the slave communication device receives a pager signal including the originating telephone number and an originating instruction that originating should be performed to the originating telephone number.

A second configuration of a master communication device according to the present invention is characterized, in the first configuration, by further comprising storage means for storing a pager ID of each of the slave communication devices to which control has been delegated, and characterized in that the control means reads the pager ID from the storage means and controls the wireless communication means to perform originating to the pager ID of the slave communication device such that the pager signal reception means of the slave communication device receives the pager signal including the originating telephone number and the originating instruction that originating should be performed to the originating telephone number.

A third configuration of a master communication device according to the present invention is characterized, in the second configuration, by further comprising transmission/reception means for receiving the pager ID from each of the slave communication devices in the control delegation and performing transmission and reception of various signals to and from each of the slave communication devices, and characterized in that the control means stores each of the pager IDs received from each of the slave communication devices in the storage means and creates slave IDs corresponding in number to the slave communication devices to which control is to be delegated, and controls the transmission/reception means to transmit individually each of the slave IDs to each of the slave communication devices to which control is to be delegated.

A first configuration of a master/slave communication device according to the present invention is characterized by comprising a master communication device having a unique master ID set therefor for using a wireless communication line provided by a host station and one or more slave communication devices receiving control delegation from the master communication device to perform communication using the wireless communication line for the master communication device, and characterized in that the master communication device comprises wireless communication means for performing wireless communication through the host station by transmitting the master ID to the host station, and control means for controlling the wireless communication means, and each of the slave communication devices comprises storage means for storing the master ID and a slave ID recognizable by the master communication device, wireless communication means for performing communication using the wireless telephone line for the master communication device through the host station, pager signal reception means for receiving a pager signal of a radio paging system, and control means for controlling the wireless communication means based on a predetermined pager signal received by the pager signal reception means.

A second configuration of a master/slave communication device according to the present invention is characterized, in the first configuration, in that the control means of the slave communication device normally turns off the power of the wireless communication means, and when the pager signal reception means receives a pager signal, determines whether or not the pager signal includes an originating instruction that originating should be performed to an originating telephone number, and when it determines that it is not included, performs control to maintain the power of the wireless communication means off.

A third configuration of a master/slave communication device according to the present invention is characterized, in the second configuration, in that the control means of the slave communication device performs control to turn on the power of the wireless communication means when it determines that the originating instruction that originating should be performed to the originating telephone number is included.

A fourth configuration of a master/slave communication device according to the present invention is characterized, in the third configuration, in that the control means of the slave communication device controls the wireless communication means to perform originating to an originating telephone apparatus of the originating telephone number using the master ID after the power of the wireless communication means is turned on.

A fifth configuration of a master/slave communication device according to the present invention is characterized, in any one of the first to fourth configurations, in that, when the pager signal reception means receives the pager signal including the originating telephone number of the originating telephone apparatus, the control means of the slave communication device performs control to notify a user of the fact that a telephone call should be made to the originating telephone apparatus of the originating telephone number.

A sixth configuration of a master/slave communication device according to the present invention is characterized, in any one of the first to fifth configurations, in that each of the slave communication devices comprises transmission/reception means for receiving the slave ID created by the master communication device in the control delegation and performing transmission and reception of various signals to and from the master communication device, and when the transmission/reception means receives the slave ID, the control means of each slave communication device controls the storage means to store the slave ID in the storage means.

A seventh configuration of a master/slave communication device according to the present invention is characterized, in the sixth configuration, in that the storage means of each of the slave communication devices has a pager ID stored therein for the page signal received by the pager signal reception means, and the control means of each slave communication device controls the storage means and the transmission/reception means to read and transmit the pager ID to the master communication device in the control delegation.

An eighth configuration of a master/slave communication device according to the present invention is characterized, in any one of the first to seventh configurations, in that the master communication device comprises storage means for storing a pager ID of each of the slave communication devices to which control has been delegated, and the control means of the master communication device reads the pager ID from the storage means and controls the wireless communication means to perform originating to the pager ID of the slave communication device such that the pager signal reception means of the slave communication device receives the pager signal including the originating telephone number and the originating instruction that originating should be performed to the originating telephone number.

A ninth configuration of a master/slave communication device according to the present invention is characterized, in the eighth configuration, in that the master communication device comprises transmission/reception means for receiving the pager ID from each of the slave communication devices in the control delegation and performing transmission and reception of various signals to and from each of the slave communication devices, and the control means of the master communication device stores each pager ID received from each of the slave communication devices in the storage means and creates slave IDs corresponding in number to the slave communication devices to which control is to be delegated, and controls the transmission/reception means to transmit individually each of the slave IDs to each of the slave communication devices to which control is to be delegated.

A tenth configuration of a master/slave communication device according to the present invention is characterized, in any one of the first to ninth configurations, in that, when the wireless communication means receives, during communication with an originating telephone apparatus, a signal indicating an originating telephone number of the originating telephone apparatus and a signal specifying any of the slave communication devices to which control has been delegated originated from the originating telephone apparatus, the control means disconnects the communication with the telephone apparatus and controls the wireless communication means such that the pager signal reception means of the slave communication device receives a pager signal including an originating instruction that originating should be performed to the originating telephone number.

An eleventh configuration of a master/slave communication device according to the present invention is characterized, in any one of the first to tenth configurations, in that the pager signal reception means of the slave communication device receives a pager signal including the originating telephone number of the originating telephone apparatus and an originating instruction that originating should be performed to the originating telephone number originated from the originating telephone apparatus.

A first configuration of a wireless communication system according to the present invention is characterized by comprising a master communication device having a unique master ID set therefor for using a wireless telephone line, one or more slave communication devices receiving control delegation from the master communication device to perform communication using the wireless telephone line for the master communication device, and a host station for performing control of communication using the wireless telephone line and transmission control of a pager signal of a radio paging system, and characterized in that the master communication device comprises wireless communication means for performing wireless communication through the host station by transmitting the master ID to the host station, and control means for controlling the wireless communication means, and each of the slave communication devices comprises storage means for storing the master ID and a slave ID recognizable by the master communication device, wireless communication means for performing communication using the wireless telephone line for the master communication device through the host station, pager signal reception means for receiving a pager signal of the radio paging system, and control means for controlling the wireless communication means based on a predetermined pager signal received by the pager signal reception means.

A second configuration of a wireless communication system according to the present invention is characterized, in the first configuration, in that the host station has a plurality of radio signal transmission/reception means for performing transmission/reception of a radio signal using the wireless telephone line and receiving a radio signal originated from the wireless communication means of the master communication device or the wireless communication means of each slave communication device to perform location registration.

BRIEF DESCRIPTION OF THE DRAWINGS

FIG. 5 is a flow chart for explaining processing of the slave communication device after the control delegation;

FIG. 6 is a flow diagram for explaining operation performed by a user of an originating telephone or the like; and FIG. 7 is a flow chart for explaining processing of the master communication device after the control delegation.

Figure 1:
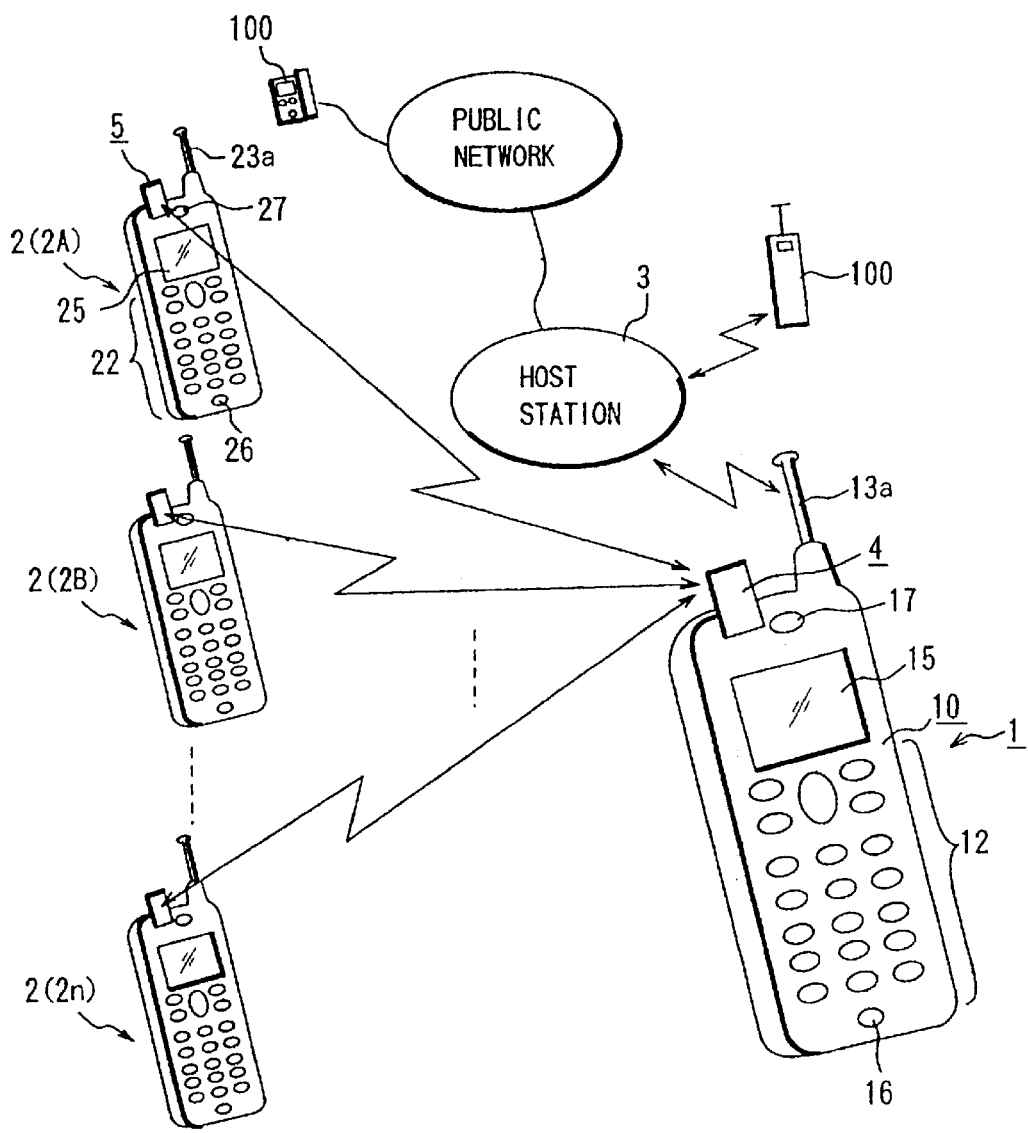
FIG. 1 is a diagram for explaining an outline of a communication system to which the present invention is applied.

DESCRIPTION OF THE REFERENCE NUMBERS 1 master communication device
2 slave communication device (wireless communication device)
3 host station
30 central control station
31 cellular control station section
32 radio paging control station section
34, 35 cellular base station (radio signal transmission/reception means)
36 radio paging base station
100 originating telephone (originating telephone apparatus)
10 portable telephone body
11 control section
12 operation input section
13 transmission/reception section (wireless communication means)
15 display section
16 sound input section
17 sound output section
18 vibrator
19 memory
4 responder (transmission/reception means)
20 portable telephone body
21 control section
22 operation input section
23 transmission/reception section (wireless communication means)
24 pager signal reception section (pager signal reception means)
25 display section
26 sound input section
27 sound output section
28 vibrator
29 memory
5 interrogator (transmission/reception means)

BEST MODE FOR CARRYING OUT THE INVENTION

An embodiment of the present invention will be described in detail with reference to the drawings.

General Outline

FIG. 1 shows a conceptual diagram of a communication system to which the present invention is applied.

In the communication system of the present embodiment, when an unspecified originating telephone 100 performs originating (originates a call) to any slave communication device (for example, a slave communication device 2A) of a plurality of slave communication devices 2 (2A, 2B, ... 2n) in a state where they have acquired slave IDs from a master communication device 1 and received control delegation, the master communication device 1 once receives the call originated from the originating telephone 100 by way of a host station 3 and transmits the fact of that originated call to the slave communication device 2A, and the slave communication device 2A performs originating to the originating telephone 100 through the host station 3, thereby allowing bi-directional communication between the originating telephone 100 and the specified slave communication device through the host station 3.

Here, the master communication device 1 has a unique ID (telephone number) set therefor for a telephone line for mobile communication (hereinafter referred to as "mobile communication lines"), and the ID (hereinafter referred to as "master ID") is registered and managed by the host station 3. On the other hand, each slave communication device 2 does not have a unique ID for the mobile communication line but has a unique ID (pager ID) set therefor for receiving a pager signal, and the pager ID is registered and managed by the host station 3. (Schematic Configuration of Master Communication Device)

The master communication device 1 has a portable telephone body 10 provided with functions as a portable telephone, and a responder 4 for transmitting and receiving various signals to and from the respective slave communication devices 2A to 2n. The master communication device 1 has a function of performing transmission and reception of radio signals to and from the respective slave communication devices 2A to 2n through the responder 4 and a function of performing transmission and reception of radio signals to and from the host station 3 over the mobile communication line based on the master ID.

The portable telephone body 10 of the master communication device 1 has the master ID (telephone number) set therefor for using the mobile communication line. As shown in FIG. 1, an antenna 13a of a wireless communication means for performing wireless communication with the host station 3 is arranged on the top of a device body (housing) and on the front of the device, arranged from the top are a sound output section 17 formed of a speaker or the like, a display section 15 comprising a liquid crystal panel or the like, and operation input section 12 comprising a number of key switches for entering telephone numbers or various commands, a sound input section 16 formed of a microphone or the like. The other constituent parts of the master communication device 1 are later described with reference to FIG. 2.

While the embodiment is configured such that the responder 4 is integrally provided on the top of the portable telephone body 10 as shown in FIG. 1, the configuration is, of course, not limited to this arrangement, and further, a configuration in which the responder 4 is removably provided for the portable telephone body 10 may be used.

Schematic Configuration of Slave Communication Device

On the other hand, each of the slave communication devices 2A to 2n has a portable telephone body 20 and an interrogator 5 for performing transmission and reception of various signals to and from the master communication device 1. Each of the slave communication devices 2A to 2n has a function of performing transmission and reception of radio signals to and from the master communication device 1 through the interrogator 5, a function of receiving a pager signal transmitted from the host station 3, and a function of performing transmission and reception of radio signals to and from the host station 3 over the mobile communication line based on the master ID of the master communication device 1 on condition that control delegation is received from the master communication device 1.

The portable telephone body 20 of each of the slave communication devices 2 is similar in appearance to the master communication device 1. As shown in FIG. 1, an antenna 23a of a wireless communication means for performing wireless communication with the host station 3 is arranged on the top of a device body (housing), and on the front of the device, arranged from the top are a sound output section 27 formed of a speaker or the like, a display section 25 comprising a liquid crystal panel or the like, an operation input section 22 comprising a number of key switches for entering telephone numbers or various commands, a sound input section 26 formed of a microphone or the like. The other constituent parts of the slave communication devices 2 are later described with reference to FIG. 2.

While the embodiment is configured such that the responder 5 is integrally provided on the top of the portable telephone body 20 as shown in FIG. 1, the configuration is, of course, not limited to this arrangement, and a configuration in which the responder 5 is removably provided for the portable telephone body 20 may be used, and further, a configuration in which the responder 5 is not provided and a slave ID is previously set may be used, as described later.

Outline of Host Station

Figure 3:
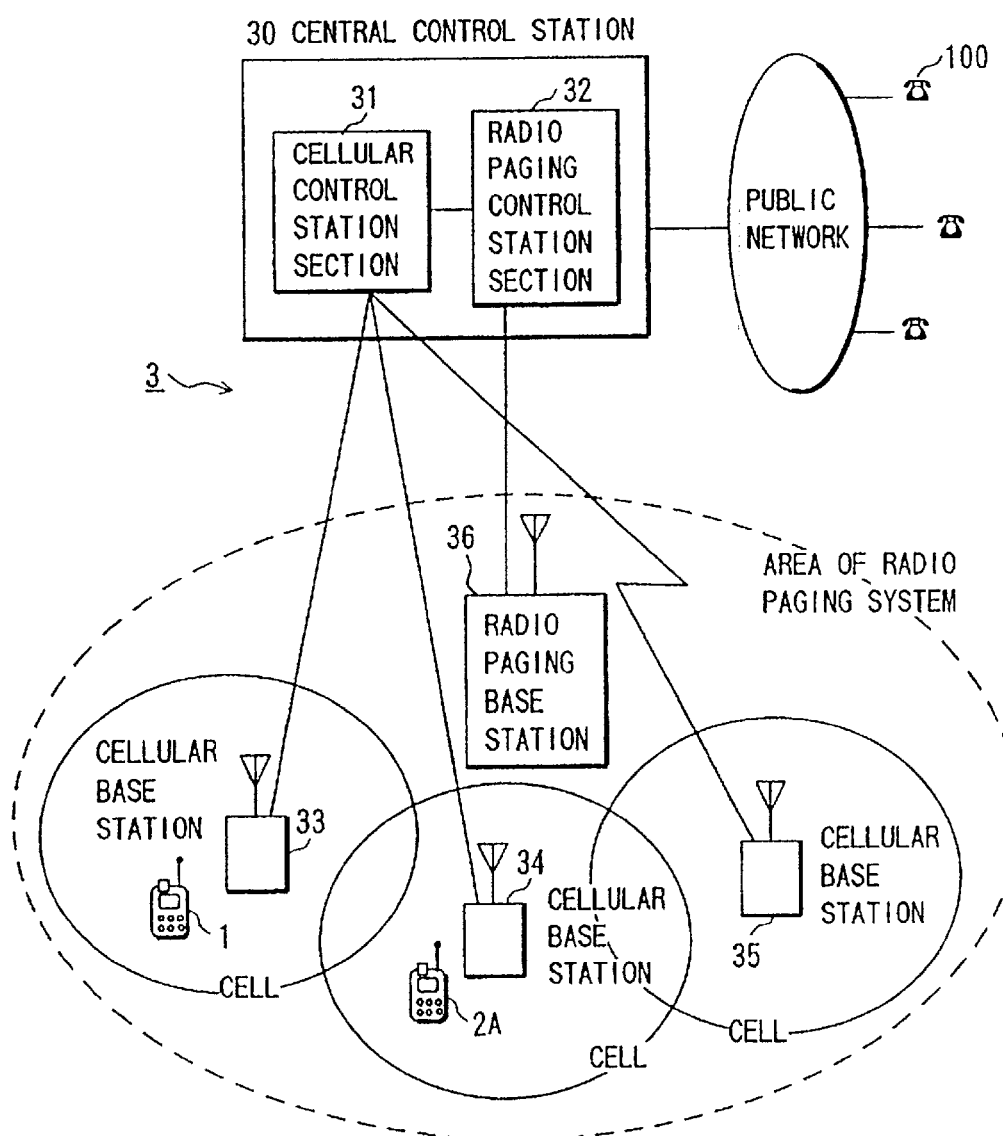
FIG. 3 is a block diagram for explaining an outline of host station.

Next, the outline of the host station 3 is described with reference to FIG. 3.

The host station 3 has a central control section 30 which includes a cellular control station section 31 for performing various controls for the mobile communication system such as switching of the mobile communication line and a radio paging control station section 32 for performing various controls for a radio paging system such as radio paging of a pager unit (beeper), and which is connected to a public network, and has a plurality of cellular base stations 33, 34, 35 connected to the cellular control station section 31, and a radio paging base station 36 connected to the radio paging control station section 32. It should be noted that, for the convenience of the description, FIG. 3 shows only three extracted cellular base stations and only one extracted radio paging base station.

The central control station 30 of the host station 3 controls the cellular control station section 31 for the mobile communication system and the radio paging control station section 32 for the radio paging system to perform switching control of both lines of fixed communication (wired) over the public network and mobile communication (wireless).

Each of the cellular base stations 33 to 35 transmits a radio signal (radio wave) for performing communication over the mobile communication telephone line to within a predetermined area (cell) based on the control of the cellular control station section 31. On the other hand, the radio paging base station 36 transmits a radio signal (radio wave) to be reached in a predetermined area such that a terminal apparatus having a pager function can receive a pager signal based on the control of the radio paging control station section 32. It should be noted that the area where the radio wave from the radio paging base station 36 can reach is wider than that of one cellular base station.

In the cellular control station section 31, telephone numbers of various portable telephones including the master communication device i are registered. In addition, the cellular control station section 31 performs control of the respective telephone numbers during use of the mobile communication line and management for accounting or the like.

The radio paging control station section 32 registers paging telephone numbers (pager IDs) of respective pager units, and upon reception of various signals including message information or the like from various originating telephone apparatuses to a predetermined pager ID, performs control for transmitting a paging signal (pager signal) to a pager unit such as a beeper having that pager ID from the radio paging base station 36 to transfer the various signals including message information or the like to the pager unit.

Circuit Configuration of Master Communication Device

Figure 2:
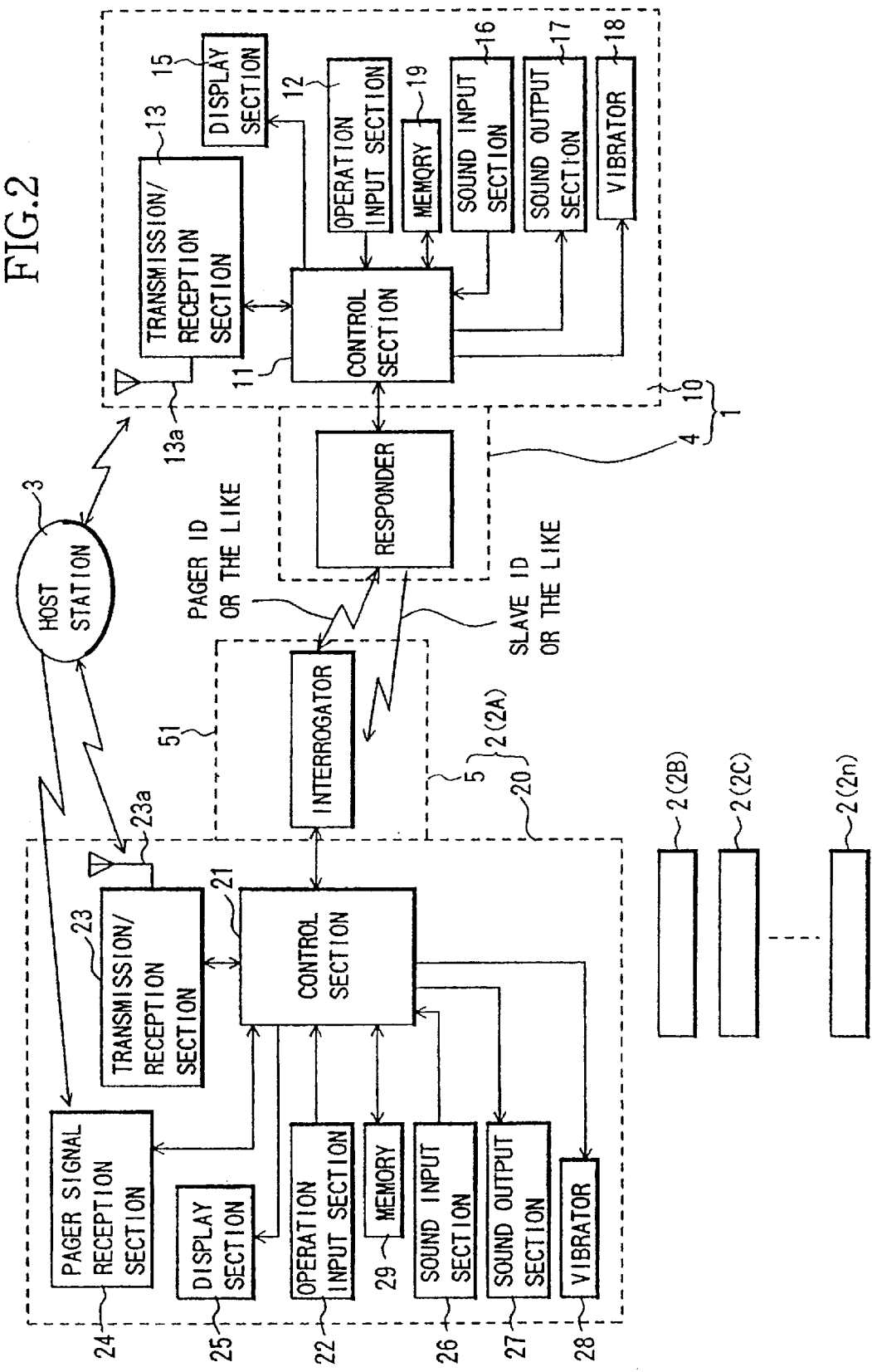
FIG. 2 is a block diagram for explaining the circuit configurations of a master communication device and a slave communication device.

Next, the circuit configurations of the master communication device 1 and the respective slave communication devices 2 are described with reference to a block diagram of FIG. 2. As shown in FIG. 2, the portable telephone body 10 of the master communication device 1 comprises a control section 11 for controlling the overall master communication device 1, the operation input section 12 described in FIG. 1, a transmission/reception section 13 as a wireless communication means for performing communication with the host station 3, the display section 15, the sound input section 16 and the sound output section 17 described in FIG. 1, a vibrator 18 for vibrating the whole master communication device 1, and a memory 19 for storing various information, later described.

The control section 11 of the portable telephone body 10 controls the transmission/reception section 13, the display section 15, the sound output section 17, the vibrator 18, and the memory 19 based on various control programs and input operation through the operation input section 12. In addition, the control section 11 of the portable telephone body 10 is connected to the responder 4, later described, to control the respective sections based on signals input from the responder 4.

The transmission/reception section 13 of the portable telephone body 10 performs transmission and reception of various radio signals to perform mobile communication through the host station 3 using the mobile communication line based on the set master ID.

The portable telephone body 10 originates a weak radio wave for location registration (radio signal for location registration) from the transmission/reception section 13 in a state in which the main power supply is turned on. When the radio signal for location registration is received by any of the cellular base stations (33 to 35), the location of the master communication device 1 is registered by the cellular control station section 31.

In addition, in the portable telephone body 10, when a telephone number of a telephone of a terminating party which is a subject of communication is input on the basis of input operation through the operation input section 12, that telephone number is displayed on the display section 15 by the control of the control section 11 to transmit a radio signal (connecting signal) for requesting a line connection with the telephone of the terminating party through the transmission/reception section 13 and the antenna 13a.

It should be noted that the aforementioned host station 3 performs processing of receiving the connecting signal transmitted from the master communication device 1 by any of the cellular base stations (33 to 35) to connect with the telephone of the terminating party by the cellular control station section 31.

Then, when the line is connected with the telephone of the terminating party, in the portable telephone body 10, voice from the telephone of the terminating party is output as voice from the sound output section 17 by the control of the control section 11, and voice in response thereto uttered by a user on the originating (calling) side is converted into an electrical signal through the sound input section 16, subjected to predetermined processing in the transmission/reception section 13, and transmitted as a radio signal for a telephone call to the telephone of the terminating party through the antenna 13a and the host station 13.

On the other hand, in the portable telephone body 10, when a radio signal (connecting signal) for connecting the line transmitted from a telephone of a party on the other end serving as an originating party through the host station 3 is received by the transmission/reception section 13 through the antenna 13a, an incoming tone is output from the sound output section 17 by the control of the control section 11 or the vibrator 18 is vibrated depending on a setting state based on the input operation through the operation input section 12. When a user of the master communication device 1 serving as a terminating party operates a predetermined key on the operation input section 12, processing of connecting the line with the originating side is performed to enter a state in which a telephone call can be made with the telephone of the party on the other end similarly to the aforementioned case.

Besides this, the operation input section 12 of the portable telephone body 10 is operated in performing various settings when communication is performed with the interrogator 5 of the slave communication device 2 through the responder 4.

The memory 19 of the master communication device 1 has a write disable storage area (ROM) and a writable storage area (RAM), and in the present embodiment, the RAM is a non-volatile area in which data in the RAM is not lost even in a state in which the main power supply is turned off.

In the ROM of the memory 19, information o n the master ID (f or example, a telephone number "090-1234-5678") concerning the mobile communication line for that master communication device 1 is stored. Then, when the master communication device 1 establishes communication over the mobile communication line, that master ID is transmitted to the side of the host station 3 from the transmission section 13 and verified with the telephone number information registered in the cellular control station section 31 of the host station 3 to perform authentication of the master ID.

In addition, in the ROM of the memory 19, a control program for performing transmission and reception of a predetermined signal in performing communication with each slave communication device 2 through the responder 4 is stored.

On the other hand, in the RAM of the memory 19, an area for storing various information transmitted from each slave communication device 2 in performing communication with each slave communication device 2, an area for storing the telephone number of the originating telephone 100, later described, a work area of the control section 11 and the like are reserved.

The responder 4 of the master communication device 1 performs transmission and reception of data to and from the interrogator 5 of the slave communication device 2 and comprises a noncontact type RFID chip. In the master communication device 1, the control section 11 creates a slave ID based on the said control program at the time of communication with the slave communication device 2 and reads the master ID from the memory 19 to supply the slave ID and the master ID to the responder 4 together with a control signal, so that the information on these respective IDs is output from the responder 4 in the form of a radio signal. It should be noted that a radio wave, an infrared ray or the like can be used as the form of the radio signal In addition, the responder 4 of the master communication device 1 outputs a connecting signal for establishing connection with the interrogator 5 of the slave communication device 2 based on the control of the control section 11 prior to transmission of the slave ID and information on control contents, which processing is described later.

Circuit Configuration of Slave Communication Device

Next, the circuit configuration of the slave communication devices 2 is described. As shown in FIG. 2, the portable telephone body 20 of the slave communication device 2 has a control section 21 for controlling the overall this slave communication device 2, the operation input section 22 described in FIG. 1, a transmission/reception section 23 as a wireless communication means for performing wireless communication through the host station 3 using the telephone line for mobile communication, a pager signal reception section 24 for receiving a pager signal from the host station 3, the display section 25, the sound input section 26 and the sound output section 27 described in FIG. 1, a vibrator 28 for vibrating the whole slave communication device 2, and a memory 29 for storing various information, later described. In addition, the interrogator 5 of the slave communication device 2 is connected to the control section 21 and performs communication for control delegation with the responder 4 of the master communication device 1.

The control section 21 of the portable telephone body 20 controls the transmission/reception section 23, the pager signal reception section 24, the display section 25, the sound output section 27, the vibrator 28, and the memory 29 based on various control programs and input operation through the operation input section 22. Also, the control section 21 is connected to the interrogator 5, later described, to control the respective sections based on signals input from the interrogator 5.

The transmission/reception section 23 of the portable telephone body 20 performs transmission and reception of various radio signals including the aforementioned radio signal for location registration in order to perform mobile communication through the host station 3 using the mobile communication line based on the master ID by using the master ID of the master communication device 1.

In the slave communication device 2, however, the control section 21 performs control such that the transmission/reception section 23 is normally not supplied with power even in a state in which the main power supply is on, and the radio signal for location registration is not originated normally. Then, when the pager signal reception section 24 receives a predetermined signal, as later described, the control section 21 performs control for turning on the power of the transmission/reception section 23.

The pager signal reception section 24 receives a pager signal transmitted from the radio paging base station 36 of the host station 3. Here, for a reduction in power consumption, the control section 21 performs control such that the power is intermittently turned on in the pager signal reception section 24 to perform intermittent reception of the pager signal.

For the pager function of the slave communication device 2, since the pager signal reception section 24 has no transmission function, a user of the slave communication device 2 may perform location registration for an area to which the user wishes to move by using a public telephone or the like when the user moves across pager signal transmittable areas of the radio paging base station 36 similarly to a typical pager system. Specifically, when the user moves across areas, for example, the user may call a registered representative number with a public telephone, not shown, and enter the paging telephone number (pager ID) of that slave communication device 2 and the number of an area to which the user wishes to move to cause the radio paging control station section 32 of the host station 3 to store information on the area to which the user is to move.

The memory 29 of the slave communication device 2 has a write disable storage area (ROM) and a writable storage area (RAM), and the RAM is a non-volatile area in which data is not lost even in a state in which the main power supply is turned off, similarly to the memory 19 of the master communication device 1.

In the ROM of the memory 29, a paging telephone number (pager ID) concerning the pager function of that slave communication device 2 is stored. In addition, in the ROM of the memory 29, a control program for performing transmission and reception of a predetermined signal in performing communication with the master communication device 1 through the interrogator 5 is stored.

On the other hand, in the RAM of the memory 29, an area for storing various information transmitted from the master communication device 1 in performing communication with the master communication device 1, a work area of the control section 21 and the like are reserved.

The interrogator 5 of the slave communication device 2 comprises a noncontact type RFID chip communicable with the responder 4 of the master communication device 1.

It should be noted that, while wireless communication is performed between the master communication device 1 and the slave communication device 2 by using the noncontact type RFID chip respectively in the present embodiment, a configuration in which wire communication is performed by connecting the master communication device 1 with the slave communication devices 2 through cables or a configuration in which communication is performed by another wireless communication means such as Bluetooth may be used.

Figure 4:
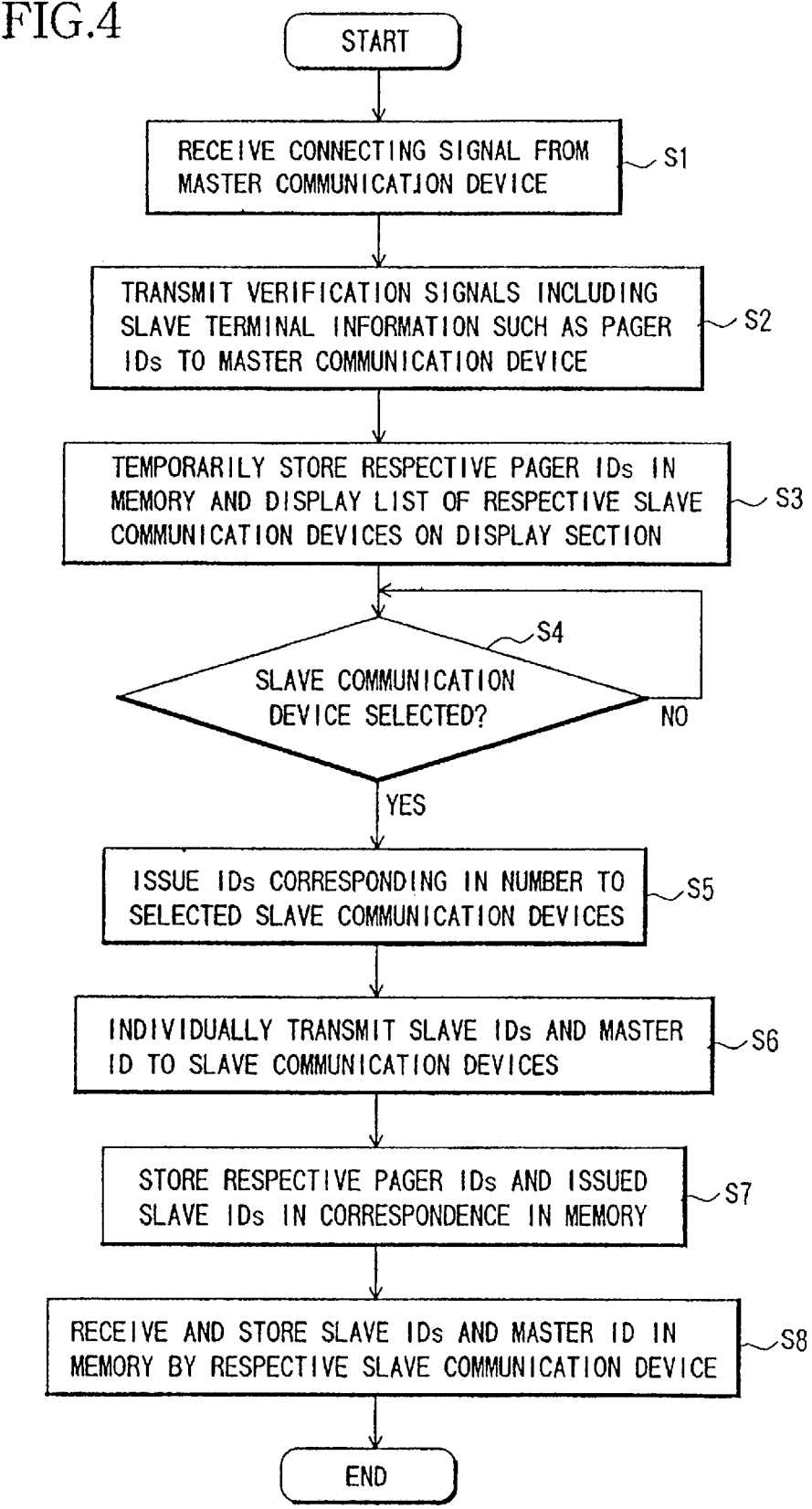
FIG. 4 is a flow chart for explaining the flow of processing for issuing respective slave IDs to a plurality of slave communication devices to delegate control by the master communication device.

Control Delegation from Master Communication Device to Slave Communication Device Next, control delegation performed from the master communication device 1 to each slave communication device 2 is described with reference to a flow chart of FIG. 4. FIG. 4 is a flow chart for explaining processing performed between the master communication device 1 and the plurality of slave communication devices 2A, 2B, . . . 2n.

In the present embodiment, first, the responder 4 of the master communication device 1 is brought near to within a predetermined distance from the respective interrogators 5 of the slave communication devices 2A to 2n, and a user of the master communication device 1 presses a predetermined key switch of the operation input section 12. At this point, a connecting signal is transmitted from the responder 4 in the master communication device 1 and the slave communication devices 2A to 2n receive this connecting signal by the respective interrogators 5 (step S1).

Next, at step S2, the respective control sections 21 of the slave communication devices 2A to 2n control the respective interrogators 5 to transmit verification signals to the master communication device 1. These verification signals include slave terminal information unique to those slave communication devices 2 and are different from one another for the respective slave communication devices 2A to 2n. Here, the slave terminal information unique to the slave communication device 2 includes at least information on the pager ID since each of the slave communication devices 2A to 2n has a unique paging telephone number (pager ID) for the pager function in the present embodiment. Besides, the slave terminal information may include, for example, information on the product numbers of the respective communication devices 2, information on users of the respective slave communication devices 2 or the like.

Upon reception of the verification signals from the respective slave communication devices 2A to 2n at the responder 4, the control section 11 of the master communication device 1 extracts and temporarily stores the respective pager IDs in the memory 19 at step S3 and controls the display section 15 to display a list of the respective slave communication devices 2A to 2n to perform display for prompting a user of the master communication device to select a slave communication device which is a subject of control delegation through operation of the operation input section 12. For the display of the list of the respective slave communication devices 2A to 2n, the respective pager IDs and other slave terminal information may be displayed. Then, the control section 11 of the master communication device 1 moves to step S4 to monitor whether or not the selection of the slave communication device is made through the input operation of the operation input section 12.

When the selection of the slave communication device is made through the input operation of the operation input section 12, the control section 11 of the master communication device 1 creates (issues) slave IDs corresponding in number to the selected slave communication devices (step S5). In the present embodiment, these slave IDs are IDs which allow the control station 11 of the master communication device 1 to recognize that they are issued by the master communication device 1 and which are different from one another to identify the respective ones of the plurality of the slave communication devices.

In this embodiment, as the slave IDs, IDs are issued by adding predetermined symbols to the master ID (telephone number) of the master communication device 1 to result in telephone numbers different from one another for the respective slave communication devices. Specifically, the slave IDs are created as "01" for the first slave communication device 2A, "02" for the second slave communication device 2B, . . . , and allocated to the respective slave communication devices.

Next, the control section 11 of the master communication device 1 controls the responder 4 to individually transmit the created slave IDs and the master ID to the respective slave communication devices 2 (step S6), and subsequently, stores the respective pager IDs and the issued slave IDs of the respective slave communication devices 2 to which control has been delegated in correspondence with each other in the RAM of the memory 19 (step S7). It should be noted that the processing at step S7 may be performed after the issue of the slave IDs and before the transmission. In addition, while the slave IDs and the master ID are simultaneously transmitted here, they may be transmitted separately.

Upon response of the signals including the slave IDs and the master ID from the master communication device 1 at the interrogators 5 in the respective slave communication devices 2A to 2n, each control section 11 extracts and stores the slave ID and the master ID in the RAM of the memory 29 (step S8). It should be noted that, in this case, the power of each transmission/reception section 23 of each of the slave communication devices 2A to 2n is kept off.

In the present embodiment, such control delegation performed from the master communication device 1 to the plurality of the slave communication devices 2 eliminates the need for setting of unique telephone numbers for using the mobile communication line on the side of the respective slave communication devices 2A to 2n to lift the burden of paying the base rate for the use rights of new telephone numbers and to save telephone number resources for the mobile communication line.

In addition, in the present embodiment, since a small amount of data is transmitted and received between the responder 4 of the master communication device 1 and the interrogators 5 of the slave communication devices 2, both of the responder 4 and the interrogators 5 can be configured using simple interfaces.

Furthermore, in the present embodiment, since the power of each transmission/reception section 23 of each of the slave communication devices 2A to 2n is normally turned off to make the portable telephone functions in an unused state, the radio signal for location registration is normally not originated from the transmission/reception sections 23 in the respective slave communication devices 2A to 2n, and inconveniences such as an increased burden of processing for location registration can be avoided on the side of the central control station 30 of the host station 3 even when the respective slave communication devices 2A to 2n move to different points distant from the master communication device 1, respectively, after the control delegation. Thus, no inconvenience occurs even when users carrying the respective slave communication devices 2A to 2n move to different points distant from the master communication device 1, respectively.

It should be noted that since the power of the pager signal reception sections 24 is always turned on, the pager function is always turned on to be in a state in which a pager signal can be received by the respective pager signal reception sections 24 in the respective slave communication devices 2A to 2n.

Operation of Respective Slave Communication Devices after Control Delegation

Next, the operation of the respective slave communication devices 2 after such control delegation is made is described with reference to a flow chart of FIG. 5. It should be noted that while only the operation of the slave communication device 2A is described here, the operation of the other slave communication devices 2B to 2n is similar thereto.

Since the pager function is always turned on as described above, the slave communication device 2A monitors by the control section 21 whether or not the pager signal reception signal 24 receives a pager signal (step S21), and when the pager signal reception section receives a pager signal, the control section 21 controls the sound output section 27 or the vibrator 28 to issue a ringing tone or vibration for paging the user (step S22).

Subsequently, the control section 21 controls the respective sections to extract various information on an originating party such as a telephone number of the originating party and a message from the originating party from the received pager signal (step S23), to store the various information in the RAM of the memory 29 (step S24), and to display the information on the display section 25 (step S25).

In addition, the control section 21 determines whether or not an instruction concerning control of the portable telephone function (an originating instruction that originating should be performed to the originating telephone number) is included in the received pager signal (step S26), and when not included, considers it as normal and simple pager originating to terminate the processing with the portable telephone function maintained off and then returns to step S21, or when included, turns on the power of the transmission and reception section 23 to turn on the portable telephone function (step S27) to perform originating using the mobile communication line for the master communication device 1, thus entering a state in which the press of a predetermined button of the operation input section 22 is waited (step S28).

With this, the transmission and reception section 23 originates a signal for location registration based on the master ID, that signal for location registration is received by the cellular base stations (33 to 35) in an area in which that slave communication device 2 is located, and the cellular control station section 31 performs processing of location registration. It should be noted that, at this point, the location registration in the cellular control station section 31 is changed from the location of the master communication device 1 to the location of the slave communication device 2A in view of step S63, later described in FIG. 7.

Then, when the predetermined button of the operation input section 22 is pressed, the control section 21 of the slave communication device 2A reads the information on the originating telephone number and the information on the master ID (for example, "090-1234-5678") from the RAM of the memory 29, and controls the transmission and reception section 23 to transmit an originating signal including these respective information (step S29). With this, the originating signal is received by the cellular base stations (33 to 35) in the area where that slave communication device 2A is located, and the central control station 30 of the host station 3 connects the originating telephone apparatus with the slave communication device 2A over the mobile communication line based on the master ID to enter a state where bi-directional communication (telephone call) is possible.

Then, the control section 21 of the slave communication device 2 monitors the state of the transmission/reception section 23 to wait until that communication is completed (step S36), and when the communication is completed by the press of a telephone call completion button of the operation input section 22 or the like, shuts down the power of the transmission/reception section 23 and controls the transmission/reception section 23 to again turn off the portable telephone function (step S31), and terminates a series of processing to return to step S21.

In this manner, in the present embodiment, since each of the slave communication devices 2 which received control delegation performs wireless communication through the host station 3 using the master ID, various processing such as authentication of the slave IDs by the host station 3 or the like is not required. Also, whoever users of the respective slave communication devices 2A to 2n are, the user of the master communication device 1 is charged for bills for the telephone charges or service charges.

In addition, in the present embodiment, in each of the slave communication devices 2 which received control delegation, when the pager signal reception means receives a pager signal, the control section 21 determines whether or not it includes the originating instruction that originating should be performed to the originating telephone number, and when not included, it is considered as a normal pager signal and the power of the transmission/reception section 23 is maintained off, so that it also has a function as a pager-only unit, in which a telephone call may be made from a public telephone or the like to the originating telephone number.

When Communication is Performed Between Originating Telephone and Slave Communication Device Next, description is made with reference to FIG. 6 and FIG. 7 for processing or the like on the side of an unspecified telephone apparatus (originating telephone 100) and the side of the master communication device 1 when the slave communication device 2A, which received control delegation from the master communication device 1 and has the slave ID set therefor in a state in which it is already distant from the master communication device 1 and the other slave communication devices 2B to 2n, receives a call originated from the originating telephone to make a telephone call. Here, FIG. 6 is a flow diagram for explaining the operation or the like performed by a user of the originating telephone, and FIG. 7 is a flow chart for explaining the processing of the master communication device 1 after the control delegation.

First, an originator performs input operation of an operation input section (not shown) of the originating telephone 100. Here, the telephone number of the master communication device 1 is keyed to perform transmission and reception of a connecting signal for establishing communication with the master communication device 1 through the host station 3 (step S41). Then, when this connecting signal is transmitted and received, the telephone number information of the originating telephone 100 is received by the transmission/reception section 31 through the host station 3, and the control section 11 of the master communication device 1 stores the originating telephone number information in the RAM of the memory 19 (step S51). After the transmission of the connecting signal, the originator hears a tone (ringing tone) from the handset of the originating telephone 100 to wait for the master communication device 1 to enter a response state (step S42).

When the transmission/reception section 13 receives the connecting signal from the host station 3 based on the originating from the originating telephone 100, the control section 11 of the master communication device 1 controls the sound output section 17 to generate a normal ringing tone (incoming tone) (step S52), and monitors the operation input section 12 to wait for response operation of the user (step S53) and monitors whether or not the ringing tone exceeds a predetermined number (step S54), and when response operation is performed within the predetermined number, response processing is performed for connecting the line with the originating side as described above (step S55) to enter a state in which a telephone call with the originator of the originating telephone 100 is possible and the processing moves to step S57, later described. On the other had, if no response is made even when the ringing tone exceeds the predetermined number, automatic response is made to perform answering machine processing (step S56) and the processing moves to step S57.

In the answering machine processing, the correspondence relationship between the users of the respective communication devices 2A to 2n and the slave IDs may be passed as a message to the originating telephone 100. For example, such a message as "01 after # for originating to 00, 02 after # for originating to 00, ... " may be passed.

When the master communication device 1 enters the responded state or the answering machine state by automatic response, the originator operates the operation input section, not shown, of the originating telephone 100 to transmit a signal for specifying any of the slave communication devices to the master communication device 1 from the originating telephone 100 through the host station 3 (step S43).

In this example, the user of the originating telephone 100 presses a "0" key and a "1" key for specifying a slave ID "01" given to the associated slave communication device 2A by the master communication device 1 after the press of a "#" mark key of the operation input section as operation for transmitting the signal for specifying a slave communication device to the master communication device 1.

The control section 11 of the master communication device 1 monitors whether or not a signal indicating the "#" mark is received from the originating party during connection with the originating telephone 100 after the response (step S57), and when the signal is received, monitors whether or not a signal indicating a slave ID of any of the slave communication devices is received (step S58), and when the signal is received, verifies it with the slave IDs stored in the memory 19 to specify the slave communication device 2 with which the originating telephone 100 demands to communicate (step S59), and further, associates the slave ID of the specified slave communication device (in this case, the slave communication device 2A) with the originating telephone number stored in the memory 19 at step S51 (step S60), and performs processing of disconnecting the line with the originating telephone (step S61).

It should be noted that, for the answering machine processing of the master communication device 1, for example, a voice message as "since calling will be made now, please hang up and wait for a while." may be passed, or the pager ID of the slave communication device 2A specified by the originating telephone may be notified to the user of the originating telephone before the disconnection of the line with the originating telephone.

Then, when the line with the originating telephone 100 is disconnected, the control section 11 of the master communication device 1 extracts the pager ID of the specified slave communication device 2A and controls the transmission/reception section 13 to perform originating to that pager ID, and at this point, creates, as a pager signal, information on the originating telephone number and an originating instruction for making a call to the originating telephone number (for example, "#TEL to 03-1234-5678" or the like), and performs processing of transmitting that pager signal to the host station 3 from the transmission/reception section 13 (step S62). With this, the slave communication device 2A which received that pager signal by the pager signal reception section 24 through the host station 3 performs the processing at step S21 and later as described above in FIG. 5. The processing at step S29 enables originating to the originating telephone 100 to perform communication with the originating telephone 100 through the host station 3.

The control section 11 of the master communication device 1 performs control to shut off the power of the transmission/reception section 13 for a predetermined time period to temporarily turn off the portable telephone function after the transmission of the pager signal (step S63). With this, the location registration of the slave communication device 2A and the originating to the originating terminal apparatus at step S29 described above are smoothly performed to avoid the inconvenience of confused location registration processing on the side of the central control station 30 of the host station 3.

It should be noted that, for the processing at step S42 in FIG. 6 in the originating telephone 100, automation is possible by storing in the originating telephone 100 a control program in which, in making a call from the originating telephone 100 to the master communication device 1, when the user of the originating telephone 100 enters the telephone number of the master communication device 1 and subsequently a predetermined key including the slave ID "01" for specifying the slave communication device, response of the master communication device 1 is automatically detected, and a signal corresponding to the pressing of the "#" mark key, the "0" and "1" is automatically transmitted after the response of the master communication device 1, thereby reducing time and effort of the user of the originating telephone 100.

In the aforementioned embodiment, while description has been made for a case in which so-called callback processing is performed after the master communication device 1 is passed to perform communication between the originating telephone 100 and the slave communication device 2, the present invention is not limited thereto. The originating telephone 100 may directly transmit a signal that a call should be made to the originating telephone to the pager signal reception section 24 of the slave communication device 2 through the host station 3. With this, for example, communication can be established between the slave communication device 2 and the originating telephone 100 through the host station 3 even when the main power supply of the master communication device 1 is off. It should be noted that, in this case, for the originating telephone 100, processing equivalent to the aforementioned processing at step S62 of the master communication device 1 maybe performed to transmit a pager signal including an originating instruction that originating should be performed to the originating telephone number to the host station 3, and the processing for the slave communication device 2 need not be changed at all.

In addition, in the aforementioned embodiment, while each of the master communication device and the slave communication devices is configured to comprise the transmission/reception means (responder 4, interrogator 5) for performing transmission/reception of various signals in control delegation, the present invention is not limited thereto. A configuration in which slave IDs recognizable by the master communication device 1 are originally set for the respective slave communication devices 2, for example a configuration in which slave IDs and a master ID are written into the ROMs of the memories 29 by, for example a ROM writer or the like, not shown, may be employed to be in a state in which the slave communication devices 2 receive, in a manner of speaking, semipermanent control delegation from the master communication device 1, and in this case, the said transmission/reception means may be omitted.

As described above, according to the present embodiment, since each of the slave communication devices 2 which received control delegation performs wireless communication through the host station 3 using the master ID on condition that the predetermined pager signal is received, various processing such as authentication of the slave IDs by the host station 3 is not required, and the individual slave communication devices 2 can acquire information on the telephone number of the originating telephone apparatus to perform originating to the originating telephone apparatus to perform mutual communication through the host station 3 even when they are at positions distant from the master communication device 1.

While in the aforementioned embodiment, a case in which the master communication device 1 is applied to a portable telephone has been described, the master communication device 1 is applicable to a personal computer and other various terminal apparatuses.

In addition, while in the aforementioned embodiment, a case in which the slave communication device 2 is applied to a portable telephone has been described, the slave communication device 2 is applicable to a digital camera, a video camera, a so-called mobile personal computer, and other various portable type electronic apparatuses. Thus, even an electronic used relatively infrequently is used as the slave communication device to allow escape from the burden of the base rate resulting from new subscription of a mobile communication telephone, and simultaneously, to reduce telephone number resources of mobile communication telephones on the communications operator side.

INDUSTRIAL AVAILABILITY

Since the present invention is configured as above, it is possible to provide a wireless communication device as a slave communication device, a master communication device, a master/slave communication device, and a wireless communication system which allow a slave communication device to perform communication with an originating telephone apparatus through a host station based on a call originated from that originating telephone apparatus even when there are a number of slave communication devices which received control delegation from a master communication device to have slave IDs set therefor and that slave communication device moves to a position away from the master communication device or the other slave communication devices, presenting extreme industrial usefulness.

What is claimed is:

1. A wireless communication device receiving control delegation from a master communication device having a unique master ID set therefor for using a wireless telephone line provided by a host station so as to perform communication by using the wireless telephone line for said master communication device, said wireless communication device comprising:

storage means for storing said master ID and a slave ID that is recognizable by said master communication device;

wireless communication means for performing communication by using the wireless telephone line for said master communication device through said host station;

pager signal reception means for receiving a pager signal of a radio paging system; and control means for controlling said wireless communication means based on a predetermined pager signal received by said pager signal reception means;

wherein said control means normally keeps the power of said wireless communication means turned off; and wherein, when said pager signal reception means receives a pager signal, said control means determines whether or not the pager signal includes an originating instruction specifying that originating should be performed to an originating telephone number, and, when said control means determines that the originating instruction is not included in the pager signal, said control means performs control to maintain that the power of said wireless communication means remains off.

2. The wireless communication device according to claim 1, wherein said control means performs control to turn on the power of said wireless communication means when said control means determines that the originating instruction specifying that originating should be performed to the originating telephone number is included in the pager signal.

3. The wireless communication device according to claim 2, wherein said control means controls said wireless communication means to perform originating to an originating telephone apparatus of the originating telephone number using said master ID after the power of said wireless communication means is turned on.

4. The wireless communication device according to claim 1, wherein when said pager signal reception means receives said pager signal including the originating telephone number of the originating telephone apparatus, said control means performs control to notify a user that a telephone call should be made to the originating telephone apparatus of said originating telephone number.

5. The wireless communication device according to claim 1, further comprising transmission/reception means for receiving the slave ID created by said master communication device in said control delegation and performing transmission and reception of various signals to and from said master communication device, and wherein, when said transmission/reception means receives said slave ID, said control means controls said storage means to store said slave ID in said storage means.

6. A wireless communication device receiving control delegation from a master communication device having a unique master ID set therefor for using a wireless telephone line provided by a host station so as to perform communication by using the wireless telephone line for said master communication device, said wireless communications device comprising:

storage means for storing said master ID and a slave ID that is recognizable by said master communication device;

wireless communication means for performing communication by using the wireless telephone line for said master communication device through said host station;

pager signal reception means for receiving a pager signal of a radio paging system;

control means for controlling said wireless communication means based on a predetermined pager signal received by said pager signal reception means; and transmission/reception means for receiving the slave ID created by said master communication device in said control delegation and performing transmission and reception of various signals to and from said master communication device;

wherein, when said transmission/reception means receives said slave ID, said control means controls said storage means to store said slave ID in said storage means;

wherein said storage means has a pager ID stored therein for the pager signal received by said pager signal reception means; and wherein said control means controls said storage means and said transmission/reception means to read and transmit said pager ID to said master communication device in said control delegation, respectively.

7. A master communication device having a unique master ID set therefor for using a wireless telephone line provided by a host station, using at least one slave communication device, and providing each of the at least one slave communication device with a slave ID created on the basis of said master ID so as to perform control delegation to each of the at least one slave communication device, wherein:

said master communication device comprises first wireless communication means for performing wireless communication through said host station by transmitting said master ID to said host station, and first control means for controlling said first wireless communication means; each of said at least one slave communication device comprises storage means for storing said master ID and a slave ID that is recognizable by said master communication device, second wireless communication means for performing communication by using the wireless telephone line for said master communication device through said host station, pager signal reception means for receiving a pager signal of a radio paging system, and second control means for controlling said second wireless communication means based on a predetermined pager signal received by said pager signal reception means; and when said first wireless communication means receives, during communication with an originating telephone apparatus, a signal indicating an originating telephone number of the originating telephone apparatus and a signal specifying any of the at least one slave communication device to which control has been delegated that has originated from said originating telephone apparatus, said first control means disconnects the communication with said originating telephone apparatus and controls said first wireless communication means such that said pager signal reception means of said any of said at least one slave communication device receives a pager signal including said originating telephone number and an originating instruction specifying that originating should be performed to said originating telephone number.

8. The master communication device according to claim 7, wherein said master communication device further comprises storage means for storing a pager ID of each of said at least one slave communication device to which control has been delegated, and wherein said first control means reads said pager ID from said storage means of said master communication device and controls said first wireless communication means to perform originating to the pager ID of said any of said at least one slave communication device such that said pager signal reception means of said any of said at least one slave communication device receives the pager signal including the originating telephone number and the originating instruction specifying that originating should be performed to said originating telephone number.

9. The master communication device according to claim 8, wherein said master communication device further comprises transmission/reception means for receiving the pager ID from each of the at least one slave communication device in said control delegation and performing transmission and reception of various signals to and from each of the at least one slave communication device, and wherein said first control means stores each of the pager IDs received from each of the at least one slave communication device in said storage means of said master communication device, creates slave IDs corresponding in number to the number of slave communication devices to which control is to be delegated, and controls said transmission/reception means to transmit the slave IDs to each of the at least one slave communication device to which control is to be delegated, respectively.

10. A master/slave communication device comprising a master communication device having a unique master ID set therefor for using a wireless communication line provided by a host station and one or more slave communication devices receiving control delegation from said master communication device so as to perform communication by using the wireless communication line for said master communication device, wherein:

said master communication device comprises wireless communication means for performing wireless communication through said host station by transmitting said master ID to said host station, and control means for controlling said wireless communication means;

each of said slave communication devices comprises storage means for storing said master ID and a slave ID that is recognizable by said master communication device, wireless communication means for performing communication by using the wireless telephone line for said master communication device through said host station, pager signal reception means for receiving a pager signal of a radio paging system, and control means for controlling said wireless communication means based on a predetermined pager signal received by said pager signal reception means;

said control means of said slave communication device normally keeps the power of said wireless communication means turned off; and when said pager signal reception means receives a pager signal, said control means of said slave communication device determines whether or not the pager signal includes an originating instruction specifying that originating should be performed to an originating telephone number, and when said control means of said slave communication device determines that the originating instruction is not included in the pager signal, said control means of said slave communication device performs control to maintain that the power of said wireless communication means of said slave communication device remains off.

11. The master/slave communication device according to claim 11, wherein said control means of said slave communication device performs control to turn on the power of said wireless communication means of said slave communication device when said control means of said slave communication device determines that the originating instruction specifying that originating should be performed to the originating telephone number is included in the pager signal.

12. The master/slave communication device according to claim 11, wherein said control means of said slave communication device controls said wireless communication means of said slave communication device to perform originating to an originating telephone apparatus of the originating telephone number using said master ID after the power of said wireless communication means of said slave communication device is turned on.

13. The master/slave communication device according to claim 10, wherein, when said pager signal reception means receives the pager signal including the originating telephone number of said originating telephone apparatus, said control means of said slave communication device performs control to notify a user that a telephone call should be made to the originating telephone apparatus of said originating telephone number.

14. The master/slave communication device according to claim 10, wherein each of the slave communication devices comprises transmission/reception means for receiving the slave ID created by said master communication device in said control delegation and performing transmission and reception of various signals to and from said master communication device, and when said transmission/reception means receives said slave ID, said control means of each of the slave communication devices controls said storage means to store said slave ID in said storage means, respectively.

15. A master/slave communication device comprising a master communication device having a unique master ID set therefor for using a wireless communication line provided by a host station and one or more slave communication devices receiving control delegation from said master communication device so as to perform communication by using the wireless communication line for said master communication device, wherein:

said master communication device comprises wireless communication means for performing wireless communication through said host station by transmitting said master ID to said host station, and control means for controlling said wireless communication means;

each of said slave communication devices comprises storage means for storing said master ID and a slave ID that is recognizable by said master communication device, wireless communication means for performing communication by using the wireless telephone line for said master communication device through said host station, pager signal reception means for receiving a pager signal of a radio paging system, control means for controlling said wireless communication means based on a predetermined pager signal received by said pager signal reception means, and transmission/reception means for receiving the slave ID created by said master communication device in said control delegation and performing transmission and reception of various signals to and from said master communication device, wherein when said transmission/reception means receives said slave ID, said control means controls said storage means to store said slave ID in said storage means; and said storage means of each of the slave communication devices has a pager ID stored therein for the pager signal received by said pager signal reception means, respectively, and said control means of each of said slave communication devices controls said storage means and said transmission/reception means to read and transmit said pager ID to said master communication device in said control delegation, respectively.

16. A master/slave communication device comprising a master communication device having a unique master ID set therefor for using a wireless communication line provided by a host station and one or more slave communication devices receiving control delegation from said master communication device so as to perform communication by using the wireless communication line for said master communication device, wherein:

said master communication device comprises wireless communication means for performing wireless communication through said host station by transmitting said master ID to said host station, and control means for controlling said wireless communication means;

each of said slave communication devices comprises storage means for storing said master ID and a slave ID that is recognizable by said master communication device, wireless communication means for performing communication by using the wireless telephone line for said master communication device through said host station, pager signal reception means for receiving a pager signal of a radio paging system, and control means for controlling said wireless communication means based on a predetermined pager signal received by said pager signal reception means; and said master communication device further comprises storage means for storing a pager ID of each of the slave communication devices to which control has been delegated, and said control means of said master communication device reads said pager ID from said storage means of said master communication device and controls said wireless communication means of said master communication device to perform originating to the respective pager ID of at least one of said slave communication devices to which control has been delegated such that said pager signal reception means of said at least one of said slave communication devices receives the pager signal including the originating telephone number and the originating instruction specifying that originating should be performed to said originating telephone number.

17. The master/slave communication device according to claim 16, wherein said master communication device further comprises transmission/reception means for receiving the pager ID from each of the slave communication devices in said control delegation and performing transmission and reception of various signals to and from each of the slave communication devices, and said control means of said master communication device stores each pager ID received from each of the slave communication devices in said storage means of said master communication device, creates slave IDs corresponding in number to the number of slave communication devices to which control is to be delegated, and controls said transmission/reception means to transmit the slave IDs to the slave communication devices to which control is to be delegated, respectively.

18. The master/slave communication device according to claim 10, wherein, when said wireless communication means of said master communication device receives, during communication with an originating telephone apparatus, a signal indicating an originating telephone number of the originating telephone apparatus and a signal specifying any of the slave communication devices to which control has been delegated that has originated from said originating telephone apparatus, said control means of said master communication device disconnects the communication with said originating telephone apparatus and controls said wireless communication means of said master communication device such that said pager signal reception means of said any of the slave communication devices receives a pager signal including an originating instruction specifying that originating should be performed to said originating telephone number.

19. The master/slave communication device according to claim 10, wherein said pager signal reception means of said any of the slave communication devices receives a pager signal including the originating telephone number of the originating telephone apparatus and an originating instruction specifying that originating should be performed to said originating telephone number which has originated from the originating telephone apparatus.

20. A wireless communication system comprising:

a master communication device having a unique master ID set therefor for using a wireless telephone line;

one or more slave communication devices receiving control delegation from said master communication device so as to perform communication by using the wireless telephone line for said master communication device; and a host station for performing control of communication using said wireless telephone line and control of the transmission of a pager signal of a radio paging system;

wherein said master communication device comprises wireless communication means for performing wireless communication through said host station by transmitting said master ID to said host station, and control means for controlling said wireless communication means, and each of said slave communication devices comprises storage means for storing said master ID and a slave ID recognizable by said master communication device, wireless communication means for performing communication by using the wireless telephone line for said master communication device through said host station, pager signal reception means for receiving a pager signal of the radio paging system, and control means for controlling said wireless communication means based on a predetermined pager signal received by said pager signal reception means.

21. The wireless communication system according to claim 20, wherein said host station has a plurality of radio signal transmission/reception means for performing transmission/reception of a radio signal by using said wireless telephone line and receiving a radio signal which originated from said wireless communication means of said master communication device or said wireless communication means of each of said slave communication devices, respectively, so as to perform location registration.

22. A wireless communication device operable to receive control delegation from a master communication device having a unique master ID set therefor for using a wireless telephone line provided by a host station so as to perform communication by using the wireless telephone line for said master communication device, said wireless communication device comprising:
  a storage section operable to store the master ID and a slave ID that is recognizable by said master communication device;
  a transmission/reception section operable to perform communication by using the wireless telephone line for said master communication device through said host station;
  a pager signal reception section operable to receive a pager signal of a radio paging system; and
  a control section operable to control said transmission/reception section based on a predetermined pager signal received by said pager signal reception section;
  wherein said control section is operable to normally keep the power of said transmission/reception section turned off; and
  wherein, when said pager signal reception section receives a pager signal, said control section is operable to determine whether or not the pager signal includes an originating instruction specifying that originating should be performed to an originating telephone number, and, when said control section determines that the originating instruction is not included in the pager signal, said control section is operable to maintain that the power of said transmission/reception section remains off.

23. The wireless communication device according to claim 22, wherein said control section is operable to perform control to turn on the power of said transmission/reception section when said control section determines that the originating instruction specifying that originating should be performed to the originating telephone number is included in the pager signal.

24. The wireless communication device according to claim 23, wherein said control section is operable to control said transmission/reception section to perform originating to an originating telephone apparatus of the originating telephone number using said master ID after the power of said transmission/reception section is turned on.

25. The wireless communication device according to claim 22, wherein, when said pager signal reception section receives said pager signal including the originating telephone number of the originating telephone apparatus, said control section is operable to perform control to notify a user that a telephone call should be made to the originating telephone apparatus of said originating telephone number.

26. The wireless communication device according to claim 22, further comprising an interrogator operable to receive the slave ID created by said master communication device in said control delegation and to perform transmission and reception of various signals to and from said master communication device, and
  wherein, when said interrogator receives said slave ID, said control section is operable to control said storage section to store said slave ID in said storage section.

27. A wireless communication device receiving control delegation from a master communication device having a unique master ID set therefor for using a wireless telephone line provided by a host station so as to perform communication by using the wireless telephone line for said master communication device, said wireless communications device comprising:
  a storage section operable to store said master ID and a slave ID that is recognizable by said master communication device;
  a transmission/reception section operable to perform communication by using the wireless telephone line for said master communication device through said host station;
  a pager signal reception section operable to receive a pager signal of a radio paging system;
  a control section operable to control said transmission/reception section based on a predetermined pager signal received by said pager signal reception section; and
  an interrogator operable to receive the slave ID created by said master communication device in said control delegation and to perform transmission and reception of various signals to and from said master communication device;
  wherein, when said interrogator receives said slave ID, said control section is operable to control said storage section to store said slave ID in said storage section;
  wherein said storage section has a pager ID stored therein for the pager signal received by said pager signal reception section; and
  wherein said control section is operable to control said storage section and said interrogator to read and transmit said pager ID to said master communication device in said control delegation, respectively.

28. A master communication device having a unique master ID set therefor for using a wireless telephone line provided by a host station, using at least one slave communication device, and providing each of the at least one slave communication device with a slave ID created on the basis of said master ID so as to perform control delegation to each of the at least one slave communication device, wherein:
  said master communication device comprises
    a first transmission/reception section operable to perform wireless communication through said host station by transmitting said master ID to said host station, and
    a first control section operable to control said first transmission/reception section; each of said at least one slave communication device comprises
    a storage section operable to store said master ID and a slave ID that is recognizable by said master communication device,
    a second transmission/reception section operable to perform communication by using the wireless telephone line for said master communication device through said host station,
    a pager signal reception section operable to receive a pager signal of a radio paging system, and
    a second control section operable to control said second transmission/reception section based on a predetermined pager signal received by said pager signal reception section; and
  when said first transmission/reception section receives, during communication with an originating telephone apparatus, a signal indicating an originating telephone number of the originating telephone apparatus and a signal specifying any of the at least one slave communication device to which control has been delegated that has originated from said originating telephone apparatus, said first control section is operable to disconnect the communication with said originating telephone apparatus and to control said first transmission/reception section such that said pager signal reception section of said any of said at least one slave communication device receives a pager signal including said originating telephone number and an originating instruction specifying that originating should be performed to said originating telephone number.

29. The master communication device according to claim 28, wherein said master communication device further comprises a storage section operable to store a pager ID of each of said at least one slave communication device to which control has been delegated, and
wherein said first control section is operable to read said pager ID from said storage section of said master communication device and to control said first transmission/reception section to perform originating to the pager ID of said any of said at least one slave communication device such that said pager signal reception section of said any of said at least one slave communication device receives the pager signal including the originating telephone number and the originating instruction specifying that originating should be performed to said originating telephone number.

30. The master communication device according to claim 29, wherein said master communication device further comprises a responder operable to receive the pager ID from each of the at least one slave communication device in said control delegation and to perform transmission and reception of various signals to and from each, of the at least one slave communication device, and
wherein said first control section is operable to store each of the pager IDs received from each of the at least one slave communication device in said storage section of said master communication device, to create slave IDs corresponding in number to the number of slave communication devices to which control is to be delegated, and to control said responder to transmit the slave IDs to each of the at least one slave communication device to which control is to be delegated, respectively.

31. A master/slave communication device comprising a master communication device having a unique master ID set therefor for using a wireless communication line provided by a host station and one or more slave communication devices receiving control delegation from said master communication device so as to perform communication by using the wireless communication line for said master communication device, wherein:
said master communication device comprises a transmission/reception section operable to perform wireless communication through said host station by transmitting said master ID to said host station, and a control section operable to control said transmission/reception section;
each of said slave communication devices comprises a storage section operable to store said master ID and a slave ID that is recognizable by said master communication device, a transmission/reception section operable to perform communication by using the wireless telephone line for said master communication device through said host station, a pager signal reception section operable to receive a pager signal of a radio paging system, and a control section operable to control said transmission/reception section based on a predetermined pager signal received by said pager signal reception section;
said control section of said slave communication device normally keeps the power of said transmission/reception section turned off; and when said pager signal reception section receives a pager signal, said control section of said slave communication device is operable to determine whether or not the pager signal includes an originating instruction specifying that originating should be performed to an originating telephone number, and when said control section of said slave communication device determines that the originating instruction is not included in the pager signal, said control section of said slave communication device is operable to perform control to maintain that the power of said transmission/reception section of said slave communication device remains off.

32. The master/slave communication device according to claim 31, wherein said control section of said slave communication device is operable to perform control to turn on the power of said transmission/reception section of said slave communication device when said control section of said slave communication device determines that the originating instruction specifying that originating should be performed to the originating telephone number is included in the pager signal.

33. The master/slave communication device according to claim 32, wherein said control section of said slave communication device is operable to control said transmission/reception section of said slave communication device to perform originating to an originating telephone apparatus of the originating telephone number using said master ID after the power of said transmission/reception section of said slave communication device is turned on.

34. The master/slave communication device according to claim 31, wherein, when said pager signal reception section receives the pager signal including the originating telephone number of said originating telephone apparatus, said control section of said slave communication device is operable to perform control to notify a user that a telephone call should be made to the originating telephone apparatus of said originating telephone number.

35. The master/slave communication device according to claim 31, wherein each of the slave communication devices comprises an interrogator operable to receive the slave ID created by said master communication device in said control delegation and to perform transmission and reception of various signals to and from said master communication device, and, when said interrogator receives said slave ID, said control section of each of the slave communication devices is operable to control said storage section to store said slave ID in said storage section, respectively.

36. The master/slave communication device according to claim 31, wherein, when said transmission/reception section of said master communication device receives, during communication with an originating telephone apparatus, a signal indicating an originating telephone number of the originating telephone apparatus and a signal specifying any of the slave communication devices to which control has been delegated that has originated from said originating telephone apparatus, said control section of said master communication device is operable to disconnect the communication with said originating telephone apparatus and to control said transmission/reception section of said master communication device such that said pager signal reception section of said any of the slave communication devices receives a pager signal including an originating instruction specifying that originating should be performed to said originating telephone number.

37. The master/slave communication device according to claim 31, wherein said pager signal reception section of said any of the slave communication devices receives a pager signal including the originating telephone number of the originating telephone apparatus and an originating instruction specifying that originating should be performed to said originating telephone number which has originated from the originating telephone apparatus.

38. A master/slave communication device comprising a master communication device having a unique master ID set therefor for using a wireless communication line provided by a host station and one or more slave communication devices receiving control delegation from said master communication device so as to perform communication by using the wireless communication line for said master communication device, wherein:

said master communication device comprises a transmission/reception section operable to perform wireless communication through said host station by transmitting said master ID to said host station, and a control section operable to control said transmission/reception section;

each of said slave communication devices comprises a storage section operable to store said master ID and a slave ID that is recognizable by said master communication device, a transmission/reception section operable to perform communication by using the wireless telephone line for said master communication device through said host station, a pager signal reception section operable to receive a pager signal of a radio paging system, a control section operable to control said transmission/reception section based on a predetermined pager signal received by said pager signal reception section, and an interrogator operable to receive the slave ID created by said master communication device in said control delegation and to perform transmission and reception of various signals to and from said master communication device, wherein when said interrogator receives said slave ID, said control section is operable to control said storage section to store said slave ID in said storage section; and said storage section of each of the slave communication devices has a pager ID stored therein for the pager signal received by said pager signal reception section, respectively, and said control section of each of said slave communication devices is operable to control said storage section and said interrogator to read and transmit said pager ID to said master communication device in said control delegation, respectively.

39. A master/slave communication device comprising a master communication device having a unique master ID set therefor for using a wireless communication line provided by a host station and one or more slave communication devices receiving control delegation from said master communication device so as to perform communication by using the wireless communication line for said master communication device, wherein:

said master communication device comprises a transmission/reception section operable to perform wireless communication through said host station by transmitting said master ID to said host station, and a control section operable to control said transmission/reception section;

each of said slave communication devices comprises a storage section operable to store said master ID and a slave ID that is recognizable by said master communication device, a transmission/reception section operable to perform communication by using the wireless telephone line for said master communication device through said host station, a pager signal reception section operable to receive a pager signal of a radio paging system, and a control section operable to control said transmission/reception section based on a predetermined pager signal received by said pager signal reception section; and said master communication device further comprises a storage section operable to store a pager ID of each of the slave communication devices to which control has been delegated, and said control section of said master communication device is operable to read said pager ID from said storage section of said master communication device and to control said transmission/reception section of said master communication device to perform originating to the respective pager ID of at least one of said slave communication devices to which control has been delegated such that said pager signal reception section of said at least one of said slave communication devices receives the pager signal including the originating telephone number and the originating instruction specifying that originating should be performed to said originating telephone number.

40. The master/slave communication device according to claim 39, wherein said master communication device further comprises a responder operable to receive the pager ID from each of the slave communication devices in said control delegation and to perform transmission and reception of various signals to and from each of the slave communication devices, and said control section of said master communication device is operable to store each pager ID received from each of the slave communication devices in said storage section of said master communication device, to create slave IDs corresponding in number to the number of slave communication devices to which control is to be delegated, and to control said responder to transmit the slave IDs to the slave communication devices to which control is to be delegated, respectively.

41. A wireless communication system comprising:

a master communication device having a unique master ID set therefor for using a wireless telephone line;

one or more slave communication devices operable to each receive control delegation from said master communication device so as to perform communication by using the wireless telephone line for said master communication device; and a host station operable to perform control of communication using said wireless telephone line and to perform control of the transmission of a pager signal of a radio paging system;

wherein said master communication device comprises a transmission/reception section operable to perform wireless communication through said host station by transmitting said master ID to said host station, and a control section operable to control said transmission/reception section, and each of said slave communication devices comprises a storage section operable to store said master ID and a slave ID that is recognizable by said master communication device, a transmission/reception section operable to perform communication by using the wireless telephone line for said master communication device through said host station, a pager signal reception section operable to receive a pager signal of the radio paging system, and a control section operable to control said transmission/reception section based on a predetermined pager signal received by said pager signal reception section.

42. The wireless communication system according to claim 41, wherein said host station has a plurality of base stations operable to perform transmission/reception of a radio signal by using said wireless telephone line and to receive a radio signal which originated from said transmission/reception section of said master communication device or said transmission/reception section of each of said slave communication devices, respectively, so as to perform location registration.

* * * * *